March 1, 1966
T. SHERWEN  3,237,709
REVERSIBLY COUPLED STEERING MECHANISM FOR
REVERSIBLY DRIVEN LAND VEHICLES
Filed April 27, 1964  2 Sheets-Sheet 1
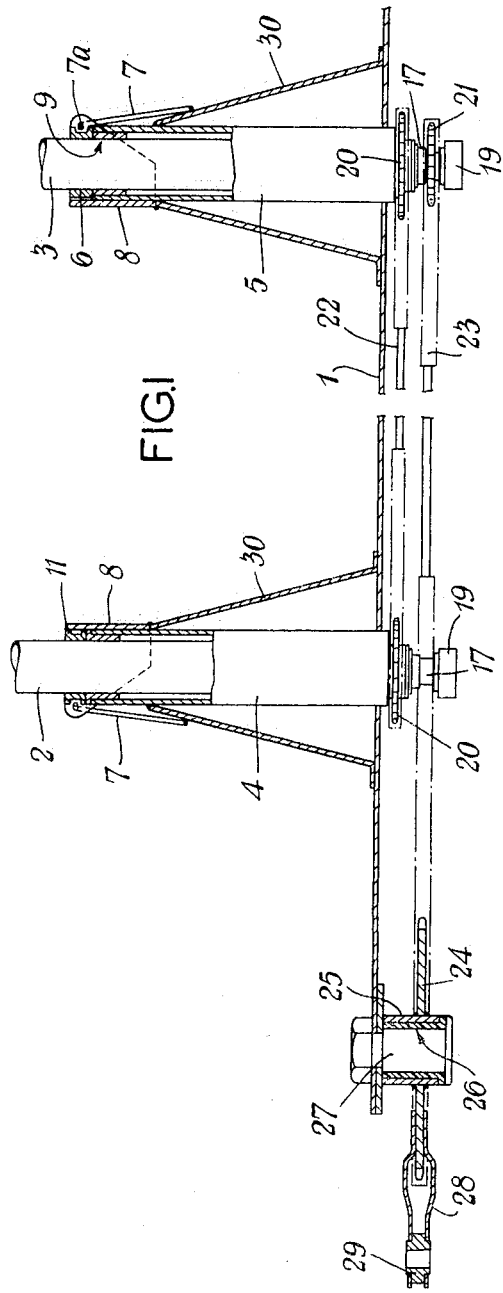
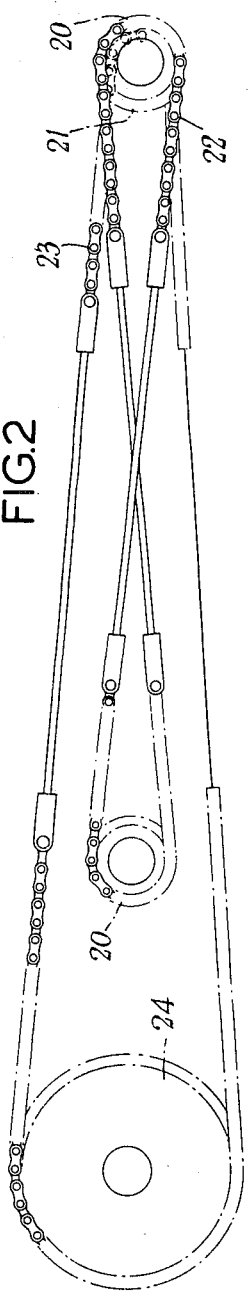
Inventor
Theo Sherwen
By Cushman, Darby & Cushman
Attorneys

United States Patent Office 3,237,709
Patented Mar. 1, 1966

3,237,709
REVERSIBLY COUPLED STEERING MECHANISM FOR REVERSIBLY DRIVEN LAND VEHICLES
Theo Sherwen, Minchinhampton, England, assignor to Prime Movers (Wiltshire) Limited, a British company, c/o The Birmingham Small Arms Co., Ltd., Birmingham, England
Filed Apr. 27, 1964, Ser. No. 362,631
Claims priority, application Great Britain, May 7, 1963, 18,065/63
15 Claims. (Cl. 180—77)

This invention relates to tractors and more especially, though not exclusively, to tractors for mounting or towing agricultural implements, and is concerned with generally facilitating the control of such vehicles while working and at the same time minimising production costs.

Accordingly, the invention provides an agricultural or other tractor having a driver's seat and steering control means supported respectively by two mountings which are spaced apart in the lengthwise direction of the tractor and both of which are adapted operatively and removably to receive either said seat or said steering control means, whereby an interchange can be effected to enable the driver to sit facing either the front or back of the tractor depending upon which facing direction provides the better field of vision for the task in hand.

In order that the invention may be clearly understood and readily carried into effect, an embodiment thereof will now be described in detail with reference to the accompanying drawings, in which:

FIGURE 1 shows a part-sectional elevation the relevant portion of a tractor frame incorporating the two mountings for receiving alternatively a driver's seat and steering control means in accordance with the invention.

FIGURE 2 is a detail plan view showing a chain drive for transmitting steering motion from either mounting.

Figure 4:
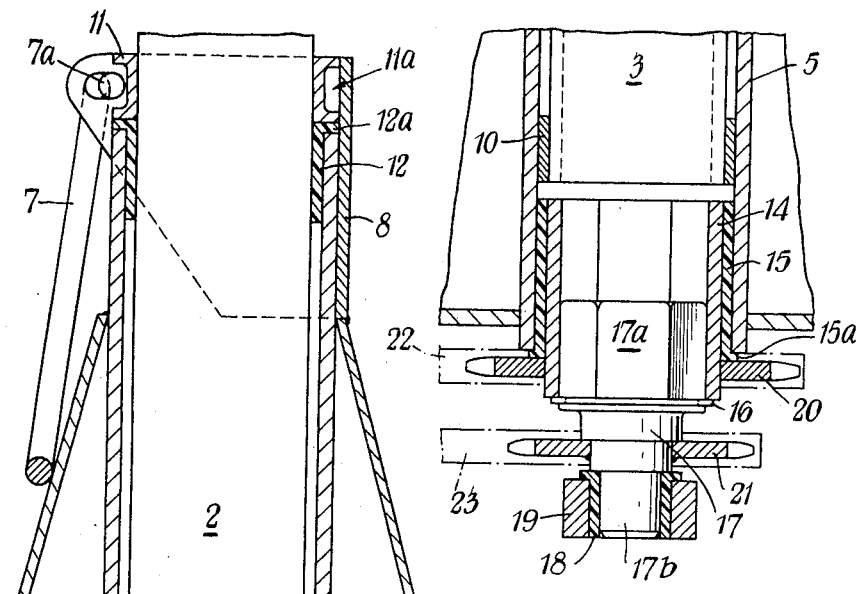
FIGURE 4 is a view similar to FIGURE 3 and shows the lower part of the rear mounting of FIGURE 1.

In the drawings, where the same references are used throughout to indicate equivalent parts, the invention as shown is applicable to a four-wheeled hydraulically driven agricultural tractor having steerable front wheels in generally known manner. The front and rear axles of the tractor are carried by a single centre spine or girder 1, which may replace the more conventional chassis frame, and which carries steering control means and a driver's seat between the aforesaid axles. The hydraulic drive, which forms no part of the present invention, is conveniently provided by hydraulic motors which are built one into each tractor wheel and supplied by a pump driven by a prime mover at the front of the tractor in accordance with known principles. At the rear of the tractor there may be provided a link frame for carrying a mounted agricultural implement.

The steering control means and driver's seat both incorporate columns 2 and 3, there being a steering wheel (not shown) of standard form secured to the upper end of the steering column 2, while a seat, which may also be of standard form, is secured to the upper end of the seat column 3. For the purpose of mounting the steering and seat columns 2 and 3 on the tractor spine or centre girder 1, the latter is provided with two similar upwardly extending sockets 4 and 5 which open upwardly. These sockets 4 and 5, which are also open at the bottom, have their lower ends entered through apertures formed in the top of the spine 1. The apertures are spaced apart along the length of the spine so that the socket 4 lies a short distance back from the front axle, while the socket 5 lies forwardly of the rear axle. Both sockets have substantially the same internal diameter and are arranged so that either socket can receive and operatively support the steering column or the seat column therein.

Figure 3:
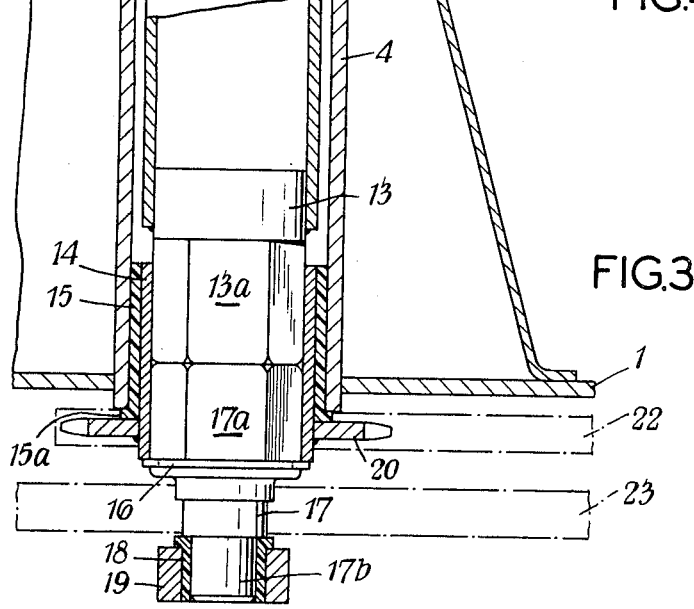
FIGURE 3 is a detail sectional view to an enlarged scale showing the front mounting in FIGURE 1.

The seat column 3, which is conveniently of hollow form and open at the bottom, is arranged to fit slidably into the receiving socket, in this case the rear socket 5. The length of seat column which can enter the socket is, however, limited by a metal locating collar 6 which is generally of D-shape or other non-circular form and is secured around the column at a location inset from the upper column end. The collar 6 then bears on the upper socket rim when the column 3 is fully home. The seat column 3 is held against withdrawal from its socket by a releasable catch means conveniently in the form of a wire locking loop 7 which co-operates with collar 6 and is pivotally carried between the side wall extremities of a channel-shaped metal strap 8 embracing the upper end of the socket. To secure the locking loop 7 to the D-collar 6, the loop 7 has a cranked portion 7a (see FIGURE 3) between its pivotal supports on the strap side walls which cranked portion enters an outwardly directed recess formed in a straight portion of the collar 6. The non-circular form of collar 6 serves to prevent rotation of the collar in the embracing strap 8 whereby the seat column 3 is rotationally located within the socket 5. The outer diameter of the seat column 3 is preferably made undersize in relation to the internal diameter of the socket 5, the sliding fit being provided by upper and lower spacer rings 9 and 10 which are secured around the seat column. If desired some form of spring may also be built into the seat column and provision may also be made for height adjustment.

The steering column 2, which is also conveniently hollow and open at the bottom, is shown fitting rotatably into the front socket 4, the extent of entry of the column 2 into the socket being limited by a locating collar 11 which is secured around the steering column. This collar 11 bears on the upper rim of socket 4 through the intermediary of an out-turned flange 12a on a nylon or other low friction bearing bush 12 which enters the top of the socket with the column. The collar 11 has an outwardly opening annular recess 11a formed therearound and is arranged to co-operate with a further releasable catch means which may again be a wire locking loop 7 pivotally carried by a channel-shaped support strap 8 which embraces the socket 4. Since, however, in the case of the steering column, the locating collar 11 is circular and has an annular recess 11a formed completely therearound, the column 2 and collar 11 can rotate in the socket 4 without hindrance from the cranked portion 7a of the locking loop 7 which thus functions simply to hold down the steering column 2 in its socket.

In order to centre the lower end of the steering column 2 in the socket 4 as well as to enable steering movements to be transmitted from the steering column, a stub shaft 13 is arranged to project from the open bottom end of the column 2. The projecting part 13a of this stub shaft has a hexagonal or like form and is arranged to fit in the upper end of an inner sleeve 14 which has a hexagonal or like internal surface and a cylindrical external surface. The sleeve 14 is rotatably located in the lower end of the socket 4 by means of a further nylon or other low friction bearing bush 15 having an out-turned flange 15a underlying the lower edge of the socket 4. The sleeve 14 is axially supported by a circlip 16 which encircles a further stub shaft 17 having an upper end portion 17a of hexagonal or like form which fits into the lower part of the sleeve. A lower reduced diameter portion 17b of shaft 17 is rotatably seated in a nylon or like bush 18 provided in a hole through a cross member 19 secured to the spine 1.

With the described arrangement at the lower end of the steering column 2, rotation of the aforesaid column in the support socket 4 will impart a similar rotation to the sleeve 14 as well as to the stub shaft 17. A sprocket wheel 20 is secured around the lower end of the sleeve 14, which projects below the socket 4, so that the aforesaid sprocket 20 will rotate with the sleeve 14 in response to steering movements imparted to the column 2.

The arrangement of the inner sleeve 14, bearing bush 15, circlip 16, stub shaft 17, bush 18, supporting cross member 19 and sprocket wheel 20 is duplicated at the lower end of rear socket 5 which, in the present example, carries the seat column 3. Since, however, rotary movement does not have to be transmitted in the case of the seat column, the stub shaft 13 at the lower end of the seat column is omitted so that there is no driving connection between the seat column 3 and the sleeve 14. The stub shaft 17 is, however, in the case of the rear socket, provided with a sprocket wheel 21 the purpose of which will later become clear.

To enable steering movements to be transmitted from the steering column to the usual track rod arm, an adjustable chain 22 with crossed runs (see FIGURE 2) is arranged to connect the sprocket wheel 20 at the lower end of the front socket 4 with the sprocket wheel 20 at the lower end of the rear socket 5. A further adjustable chain 23 then connects the sprocket wheel 21 at the lower end of the rear socket 5 with a steering arm sprocket 24 having a hub sleeve 25 mounted for rotation around a nylon or other low friction bearing bush 26 on a support post 27 secured to the spine 1. The sprockets are dimensioned to provide the correct steering ratio and an arm 28 is arranged to project radially from the steering arm sprocket 24 to connect at 29 with the usual track rod arm.

To ensure rigidity of the sockets 4 and 5, each such socket is provided with a frusto-conical support 30 secured at the lower end to the top of the spine and at the upper end around the socket near the mouth thereof. These frusto-conical supports 30 could, clearly, be replaced by any other form of support structure.

A tractor having reversible steering and seat positions as described can be driven either in a forward or reverse direction and the driving position can be adjusted so that the driver either faces forwardly or rearwardly depending upon which position will give him the better field of view for the task in hand. When an agricultural implement is being used, the driver is also able to take up the most convenient position for controlling the implement. If the driver decides to face forwardly, the seat column 3 will be placed in the rear socket 5 as shown and the steering column 2 will be placed in the front socket 4 as shown. Steering motions imparted to the column 2 will then be transmitted via the sprockets 20 and chain 22 to the sprocket wheel 21 and thence to the steering arm sprocket 24 whereby such movements are transmitted to the steering arm.

In order to reverse the direction in which the driver faces, all that is necessary is to release and withdraw the steering and seat columns from their respective sockets. The seat column is then turned through 180° and placed in the steering column socket 4, the locking loop 7 being manipulated to lock the seat column in position in the socket. The steering column 2 with the bearing bush therearound, is entered into the rear socket 5 and similarly located by means of the locking loop 7 on the rear socket. When the steering column is in the rear socket, the pinions 20 and chain 22 will merely idle and steering movements will be transmitted directly from the pinion 21 through the chain 23 to the steering sprocket 24. The result of turning the steering column, when in the rear socket, in one direction will have the effect of turning the steerable wheels in the opposite direction so that the tractor will in fact turn in the direction in which the steering wheel is turned and the steering will thus be normal. Equally, normal steering takes place when the steering column is in the front socket due to the crossing runs of chain 22.

While the invention has been described as applied to a particular form of tractor, it will be appreciated that this tractor form is only given by way of example, and in the fact the arrangement for reversing the steering gear and seat may be applied to any other form of vehicle in which such reversal may be desirable.

I claim:

1. In a steerable land vehicle, the improvement comprising: a driver's seat supporting column; a steering column; two mountings spaced apart lengthwise in a direction of the vehicle which respectively and interchangeably support said driver's seat supporting column and said steering column; each of said mountings including a rotatable member arranged to couple with the steering column when the steering column is supported in the particular mounting; means reversibly coupling one rotatable member with the other rotatable member whereby rotation of one member causes rotation of the other member in an opposite direction; and a steering mechanism coupled to one of said rotatable members for imparting steering motion to the vehicle when either of said rotatable members is rotated.

2. The steerable land vehicle of claim 1 in which said mountings include upwardly extending sockets adapted to interchangeably receive and locate said steering and seat columns.

3. The steerable land vehicle of claim 2 wherein the upper end of each socket is provided with a releasable catch means arranged to co-operate with a locating collar on each column so as to axially locate each column in its respective socket.

4. The steerable land vehicle of claim 3 wherein the collar on each column is provided with an outwardly directed recess and the catch means includes a locking loop pivotally mounted between the wall ends of a channel-shaped strap, said strap operatively engaging the socket outer extent and collar, a cranked portion on the loop being arranged to enter the collar recess in a locking position thereof.

5. The steerable land vehicle of claim 4 wherein the recess on the steering column collar extends completely around the collar so that said collar is free to rotate with the column in the socket without hindrance from the locking loop.

6. The steerable land vehicle of claim 4 wherein the locating collar on the seat column is substantially non-circular in shape to prevent rotation of said collar in said strap and to rotationally locate the seat column in its socket, the recess for receiving the cranked portion of the locking loop being provided in a straight portion of the collar.

7. The steerable land vehicle of claim 2 wherein the steering column is rotatably located in its socket by means of an upper low friction bearing bushing which surrounds the column in the socket.

8. The steerable land vehicle of claim 2 wherein the seat column is slidably located in its socket by spacing rings which are secured around the seat column in axially spaced locations.

9. The steerable land vehicle of claim 2 wherein the sockets are spaced apart one behind the other on a center member of the tractor chassis, said sockets having open lower ends which are engaged through openings in the top of said center member.

10. The steerable land vehicle of claim 9 wherein the sockets are supported by struts of conical form.

11. The steerable land vehicle of claim 9 wherein said rotatable members are cylindrical sleeves each having a hexagonal bore therethrough and are supported in the lower end of each socket, and wherein said reversible coupling means includes sprocket wheels on each sleeve and by a chain extending about said sprocket wheels and having crossed runs whereby steering motions can be transmitted to steering wheels through either said sleeves.

12. The steerable land vehicle of claim 11 wherein the sleeves are each supported by the upper ends of non-circularly shaped stub shafts engaged in the lower end of each sleeve, said shafts rotatably supported at the lower end by a bearing opening through a chassis cross member.

13. The steerable land vehicle of claim 12 wherein the sleeves and the lower stub shaft ends are each engaged in low friction bearing bushings.

14. The steerable land vehicle of claim 11 wherein said steering mechanism for imparting steering motion to the vehicle includes a further sprocket on the stub shaft of the rear socket; a chain and a steering arm sprocket rotatably carried on the chassis forwardly of the front socket and connectable with a track rod arm.

15. The steerable land vehicle of claim 11 wherein the steering column is connected with the sleeve at the lower end of the socket in which the column is housed by means of a further stub shaft having a non-circular portion projecting from the lower steering column end and fitting into the upper end of the sleeve.

References Cited by the Examiner
UNITED STATES PATENTS

| | | |
|---|---|---|
| 2,422,813 | 6/1947 | Walch. |
| 2,644,540 | 7/1953 | Balzer _____ 180—26 |

BENJAMIN HERSH, *Primary Examiner.*

E. E. PORTER, *Assistant Examiner.*